Figure 1:
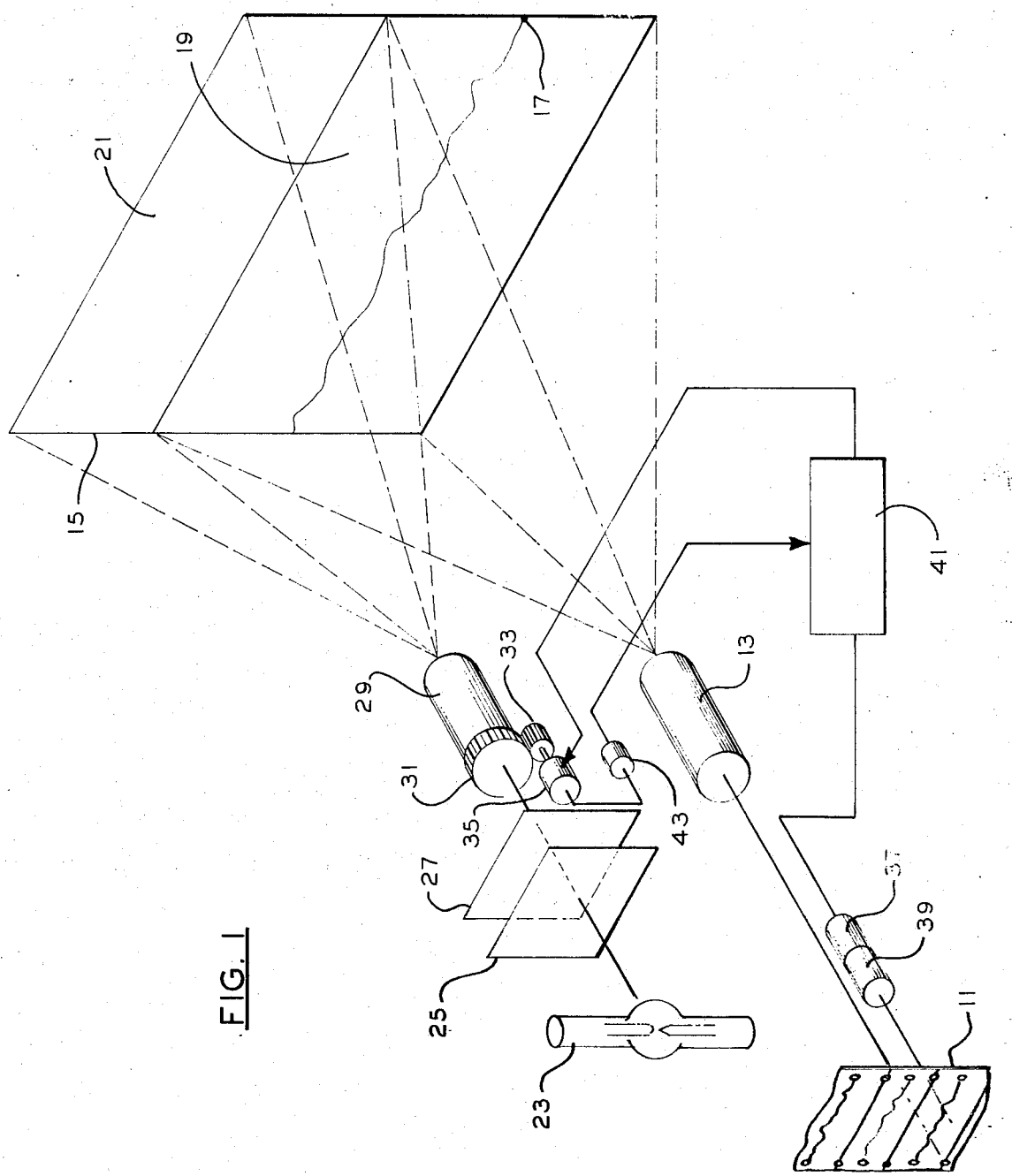

United States Patent [19]
Kittredge

[11] 3,782,815
[45] Jan. 1, 1974

[54] SKY FILL-IN PROJECTOR
[75] Inventor: Raymond E. Kittredge, Chenango Bridge, N.Y.
[73] Assignee: The Singer Company, Binghamton, N.Y.
[22] Filed: Aug. 23, 1971
[21] Appl. No.: 173,842

[52] U.S. Cl. .................................... 353/29, 353/84
[51] Int. Cl. ............................................ G03b 21/26
[58] Field of Search .................... 353/84, 29, 30, 1, 353/37, 122; 35/12 N; 350/311, 316

[56] References Cited
UNITED STATES PATENTS
| | | | |
|---|---|---|---|
| 2,566,264 | 8/1951 | Tuttle | 355/38 |
| 3,436,840 | 4/1969 | Noxon | 35/12 N |
| 3,101,645 | 8/1963 | Hemstreet | 35/12 N |

*Primary Examiner*—Louis R. Prince
*Assistant Examiner*—A. J. Mirabito
*Attorney*—Francis L. Masselle

[57] ABSTRACT

A sky fill-in projector for use with a projected real world scene, such as a motion picture, which has only a small amount of sky recorded on it, in which the sky intensity of the real world scene is sensed and a blue fill-in color of matching intensity obtained by controlling the amount of blue light permitted to pass through a projection lens arranged to project the light on a screen above the real world scene is shown. In a second embodiment color is also sensed by sensing blue and magenta and a filter which varies linearly from blue to magenta and which is in the projection path is controlled in response to the blue and magenta signals.

5 Claims, 2 Drawing Figures

SKY FILL-IN PROJECTOR

This invention relates to simulator visual systems in general and more particularly to an improved sky fill-in projector for a projected visual scene.

When moving picture film is taken for use in a simulator visual display, such as those used with aircraft simulators, the camera is normally tilted down to photograph as much of the ground scene as possible. This results in very little sky scene on the photograph. When such a photograph is displayed in a trainer it is then necessary to fill in a portion of the sky to present a realistic picture. Presently such fill-in is done through the use of a high intensity slide projector. Slides are individually prepared to match the sky color in each film to be shown, and a proper slide is selected and used as fill-in for the particular film being shown. This is obviously a time consuming operation which must be performed each time a new film or print is to be used. In addition, if sky color is not constant over the length of film being shown, or if film fades with use, a good match at all times is not possible.

The system of the present invention seeks to solve this problem by providing a fill-in projector which will sense the brightness and color of the sky in each film frame as it is displayed, and automatically adjust filters to match that brightness and color.

It is the principal object of this invention to provide a sky fill-in projector which will automatically provide a fill-in color which matches the brightness of the sky of each of a plurality film frames which are independently projected on a screen.

Another object is to provide such a projector which also matches the blue color of each film frame.

A further object is to provide such a projector which provides continuously variable color and brightness.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

Figure 2:
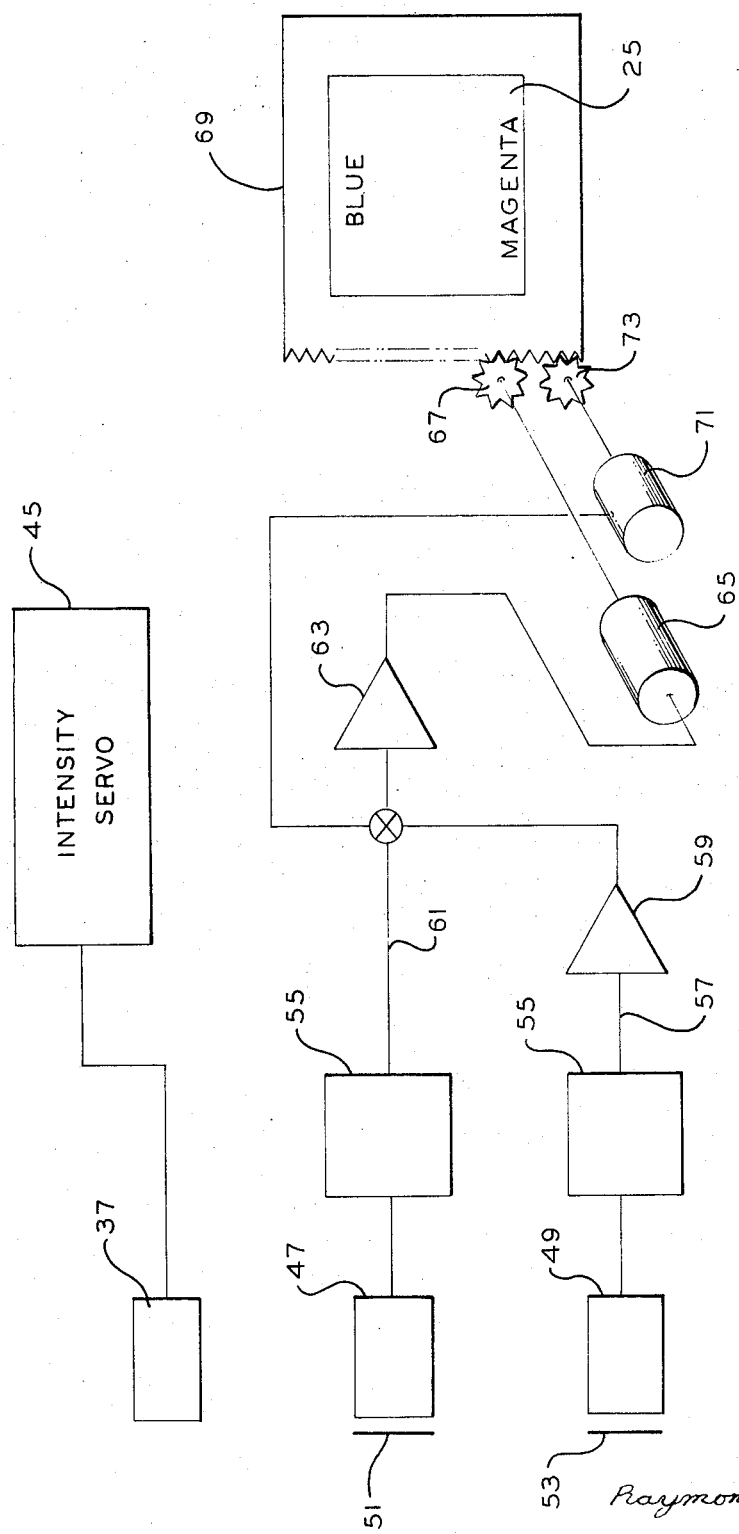

For a fuller understanding of the nature and objects of the invention reference should be had to the following detailed description taken in connection with the accompanying drawings, in which:

FIG. 1 is a perspective view of the preferred embodiment of the invention in which only brightness is controlled; and FIG. 2 shows partially in block diagram form and partially in perspective, a preferred embodiment of the invention in which both color and intensity are controlled.

FIG. 1 shows a preferred embodiment of the invention for controlling brightness. A frame of film 11 is projected in a conventional manner through projection optics 13 to screen 15. The horizon 17 on the projected real world scene will only have a small portion of sky 19 above it due to the tilting of the camera which exposed film 11. The remaining portion 21 of the screen 15 must be filled in with a blue color to provide a realistic scene to an observer.

Alternatively a television, laser or other type projector could be used. In each case the portion 21 of the screen above the real world scene will be blank and requires fill-in.

The fill-in projector comprises a high intensity light source 23 such as an arc lamp, a blue filter 25, a sky shield 27 and projection optics 29. In optics package 29 is contained a conventional iris mechanism which may be driven by rotating a gear 31. Gear 31 is driven by gear 33 mounted on the shaft of servo motor 35.

A photo diode 37 is arranged to pickup the sky brightness from the frames of film 11, through optics 39 which may be a lens, fiber optics or plastic light pipe designed to obtain the average light level over the whole sky. Light rays defining the sky of the real world scene being projected will have a particular brightness and color resulting from either the color of the film directly in a conventional movie projector or from another type projector which has developed colors in response to a previous sensing of the film, e.g., a color television camera may view the film and provide color signals to a TV projector. Optics 39 will be arranged to pick up only the rays of light from the sky portion and will image them on the photo diode 37 or other photosensitive device. Such a device will provide a voltage which is a function of the intensity of the light focused on it. If the light from the whole sky area is focused on a small photosensitive device an average brightness will result.

The signal from photo diode 37 is provided with any necessary conditioning or amplification to servo electronics 41. Since the signal will be in the form of a square wave due to the shutter bar flicker as film 11 is pulled down, means must be provided to either average the signal or detect peaks. Devices which will perform either of these functions are well known in the art and will not be detailed herein. The resulting signal is provided as an input to a conventional position servo comprising the usual amplifiers, etc., indicated by block 41, and motor 35. A feed-back signal is provided to the summing junction from a potentiometer 43 mounted on the shaft of motor 35 which is driven by the servo amplifier output.

In operation the brightness of the sky on the real world image will be sensed by photo diode 37 and the iris in lens 29 positioned in accordance with the sensed signal by the servo system. Light from source 23 will pass through blue filter 25, after which all light, other than that which will fill area 21 on screen 15, will be blocked by mask 27. The remaining light will enter lens 29 and be attenuated by the iris to match the sky portion 19 of the picture being projected.

FIG. 2 shows a block diagram of a system which matches both the intensity and color of the sky 19 of the real world image on FIG. 1. Intensity is controlled with photo diode 37 and the intensity servo 45 as described in connection with FIG. 1. Two additional photo diodes 47 and 49 are also provided. These are arranged to pick up the projected sky image 19 (of FIG. 1) in the same manner as photo diode 37. However, in front of diode 47 is a blue filter 51 and in front of diode 49 a magenta filter 53. Thus their output will indicate respectively the amounts of blue and magenta in the sky color to be matched. These outputs are passed through blocks 55 where the signal is averaged or the peaks detected as described above. The magenta signal on line 57 is inverted by inverter 59. The output of inverter 59 is then summed with the blue signal on line 61 at the summing junction of amplifier 63. This is a servo amplifier which will drive a motor 65 having on its output shaft a gear 67 which will drive a filter holder 69 in which the filter 25 of FIG. 1 is held. Rather than being a single color the filter 25 will be pure blue at the top and pure magenta at the bottom with linearly varying mixtures in between.

A follow-up potentiometer 71 will have its shaft driven by movement of holder 69 via gear 73. The zero point of the servo system will be in the middle. Thus, if equal amounts of blue and magenta are present a zero input to amplifier 63 will cause the servo to null at the center. If blue exceeds magenta, a positive signal will drive it to the blue region and if magenta exceeds blue the resulting negative signal will cause the servo to null in the lower region.

Alternatively, means may be provided to select one of a plurality of different colored slides in accordance with the blue and magenta signals. Other modifications and improvements which can be made without departing from the principles of the present invention will be obvious to those skilled in the art.

Thus, a sky fill-in projector for use with a projected scene where only a small amount of sky is available in which the color and brightness of sky in the projected scene are automatically matched has been shown. Although a film projector has been used as an illustration in the system will work equally well with a television projector or laser projector.

What is claimed is:

1. A visual display system including an image projector for generating a real world earth and sky image and a sky fill-in projector for projecting light contiguous to and matching in color and intensity the sky image projected by said image projector, said system comprising:
   a. a white light source in said fill-in projector for projecting light normally exceeding the intensity of the sky image projected by the image projector;
   b. means for sensing the average brightness of said projected sky image and developing a first electrical signal proportional thereto;
   c. means for sensing the color of said projected sky image and developing a second electrical signal corresponding thereto;
   d. means responsive to said first signal to attenuate the light projected by the fill-in projector sufficiently to match the intensity of the sky image; and
   e. means responsive to said second signal to change the color of said light to match the color of said sky image.

2. A visual display system in accordance with claim 1 wherein said color changing means includes:
   a. a color filter disposed in the optical path of light projected by said fill-in projector, the color of said filter being blue at one location, magenta at a second location spaced from the first, and a mixture of blue and magenta intermediate said locations, the relative proportions of blue and magenta varying monotonically with the highest proportion of each occurring adjacent the location of corresponding color; and
   b. servomotor means to adjust the position of said filter relative to the light path in accordance with said second signal.

3. A visual display system according to claim 2 wherein said color sensing means comprises:
   a. first and second photodiodes and optical means to direct the sky image thereto; and
   b. a blue filter and a magenta filter disposed in the light input path of respective ones of said photodiodes whereby said second signal comprises a blue signal and a magenta signal.

4. A visual display system according to claim 3 wherein said servomotor means includes:
   a. a servomotor; and
   b. means for inverting one of said blue and magenta signals, then summing said blue and magenta signals, and supplying the resultant signal to said servomotor.

5. A visual display system according to claim 4 wherein said brightness sensing means comprises an additional photodiode and optical means to direct the sky image thereto, the output of said additional photodiode constituting said first signal, and wherein the light attenuating means comprises an iris in the path of light projected by the fill-in projector and a servomotor connected to adjust said iris in accordance with said first signal.

* * * * *